Aug. 16, 1955 — M. T. SEIM — 2,715,713
SWIVEL CONNECTOR FOR A PLURALITY OF ELECTRIC CONDUCTORS
Filed Oct. 12, 1951 — 2 Sheets-Sheet 1
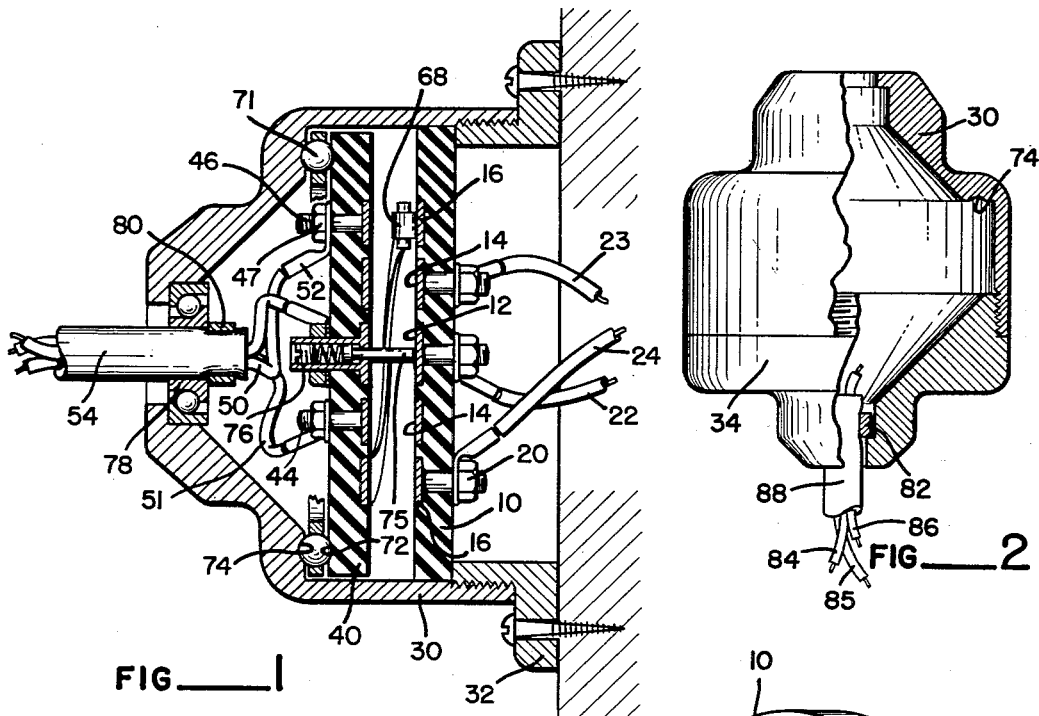
FIG. 1
FIG. 2
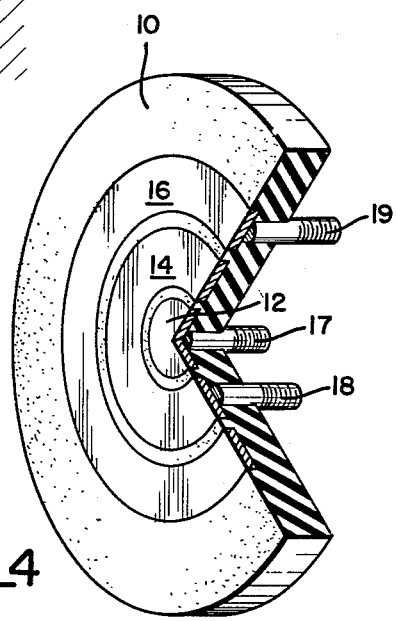
FIG. 4
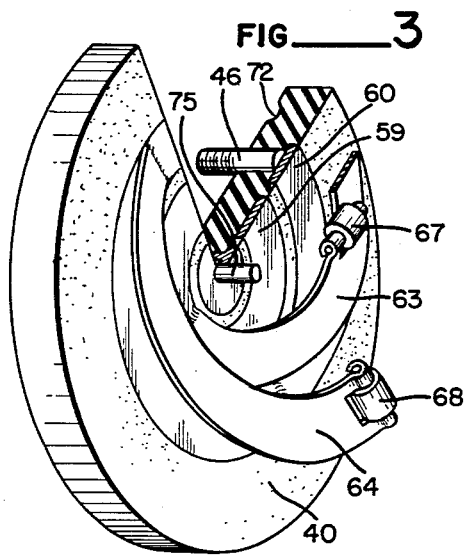
FIG. 3
MORRIS T. SEIM
Inventor
By Smith & Tuck
Attorneys Aug. 16, 1955 M. T. SEIM 2,715,713
SWIVEL CONNECTOR FOR A PLURALITY OF ELECTRIC CONDUCTORS
Filed Oct. 12, 1951 2 Sheets-Sheet 2
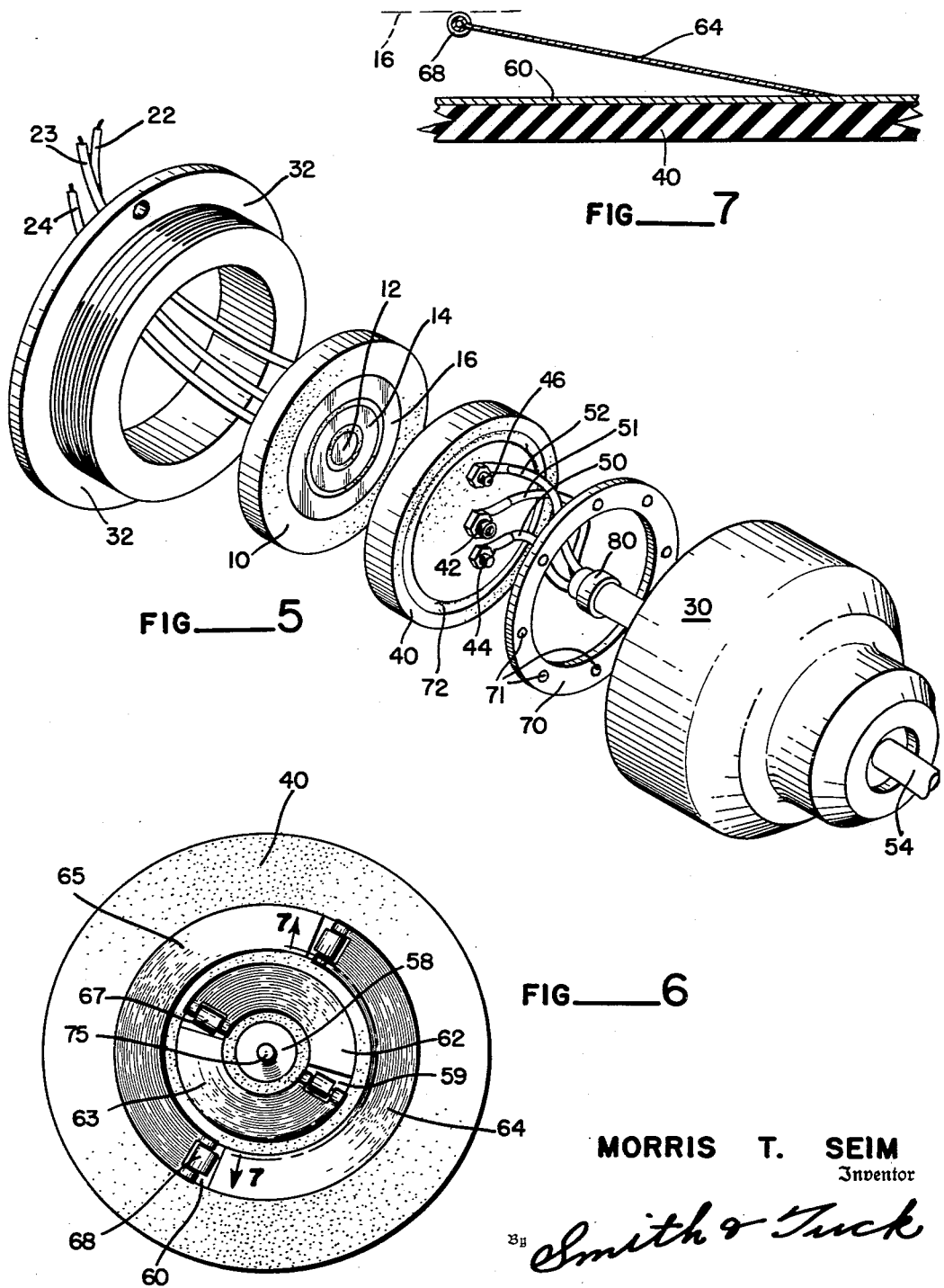
MORRIS T. SEIM
Inventor
By Smith & Tuck
Attorneys United States Patent Office 2,715,713
Patented Aug. 16, 1955

2,715,713

SWIVEL CONNECTOR FOR A PLURALITY OF ELECTRIC CONDUCTORS

Morris T. Seim, Seattle, Wash.

Application October 12, 1951, Serial No. 251,015

5 Claims. (Cl. 339—8)

This present invention consists of two plate members each of which is adapted for connection to the plurality of conductors forming an electric cable. Means are then provided for the easy revolution of one of the plates with respect to the other and means are provided for transferring the current from one plate to the other, whether they are at rest or moving angularly about a common longitudinal axis. Housings are then provided that will adapt this principle to the various types of installations.

This present invention has, as its principal object, the provision of a swivel connector which will connect together a plurality of electric circuits such as is normally encountered in a power cable and is provided with elements so free turning that the amount of torsion required to revolve the contact members within the connector can be transmitted through an electrical cable and thus prevent any possible kinking of the conductor cable. In the past a large number of swivel connectors have been provided ostensibly for this same purpose. However, those that have been observed and studied have been found to be of one or the other of two general classes, one in which such a light brushing contact was provided that the continuity of current could not be depended upon and if any substantial current was passed through the device, arcing and burning of the contact members resulted. On the other hand in the effort to provide certainty of flow of current between the contact members, the brushing friction mounted up to such a total that it was only possible to enjoy the swiveling capability of the device by manually grasping the two halves of the swivel and physically displacing them with respect to each other; and while this might serve certain purposes, it falls far short of a swivel for general use. With my present design I have found it possible, for instance, to connect together the elements of a telephone so that the relatively light cables, incapable of imparting much torque, still could move the elements and prevent twisting of the cables. The other extreme in general household use, and this is the field of greatest application of this device, is on electric devices particularly those that are used manually a good deal such as curling irons, mechanical mixers, washing machines, polishing devices and especially the electric flatiron. The electric flatiron imposes one of the greatest loads of any of the household gadgets and it is necessary to provide a unit that will be able to pass a large current in order to function with such a device. Such installations are easily solved with my present device.

The principal object of my present invention therefore is to provide a simple, compact swivel connector that will connect together a plurality of electric circuits and still keep them all well insulated from each other.

A further object of my invention is to provide a swivel connector in which means are provided to insure the ready flow of heavy current drains through the device without the necessity of imposing heavy frictional loads which might otherwise limit the swiveling action of the device.

A further object of my invention is to provide a swiveling device so constructed that it will revolve very easily so that the turning movement required can be supplied by a relatively easily distorted connected cable, and thus there will be no tendency for the cables to kink.

A further object of my invention is to provide a swivel connector that can be very economically made and because of its simplicity can be expected to give long periods of useful service without maintenance.

Further objects, advantages and capabilities will be apparent from the description and disclosure in the drawings, or may be comprehended or are inherent in the device.

In the drawings:

Figure 1 is a typical cross sectional view through a swivel connector made after the teachings of my present invention; certain parts have been broken away in order to simplify the showing and avoid confusion;

Figure 2 is a face view of my swivel connector intended to connect two cables without providing the fixed support as illustrated in Figure 1;

Figure 3 is a perspective view, partly in section, showing the brush plate of my device together with certain other contact members;

Figure 4 is a perspective view, partly in section, showing the commutator ring plate used in association with the brush plate of Figure 3;

Figure 5 is an exploded perspective view illustrating the principal elements making up my present swivel connector;

Figure 6 is a face view of the brush plate shown in Figure 3; and

Figure 7 is an enlarged, fragmentary sectional view taken generally along the circular line 7—7 of Figure 6.

Referring more particularly to the disclosure in the drawings, the numeral 10 designates the commutator ring plate. This member is formed preferably of dielectric material and provided with a plurality of circle or concentric ring contact members as 12, 14 and 16 made of material having a high degree of electric conductivity, preferably brass or copper. In the various illustrations forming part of this application three such contact members are shown. It is believed, however, that it will be apparent that any reasonable number of such contact members could be employed, the only requirement being that they are insulated from each other and are of sufficient extent to adequately receive the current flow from the revolvable brushes with which they are used. Secured to each of the contact members are conductor posts or bolts as 17, 18 and 19. These members are fully grounded electrically with commutators 12, 14 and 16 respectively and are adapted to receive and to have secured thereto, as by suitable nuts 20, the electric conductors 22, 23 and 24. Suitable means is employed to hold plate 10 against rotation. One convenient means, particularly applicable when the devices are made in small size, is to have the diameter of plate 10 a press fit within the housing member 30. Plate 10 can be properly forced into place by having the base member as 32, or a secondary bell shaped base 34 as illustrated in Figure 2, arranged with co-acting threads so as to be threaded to and move inwardly of housing 30. This forms a convenient anchorage for plate 10 without the necessity of aligning keys and keyways or some other such means.

Disposed for rotation within housing 30 and in a plane parallel to the plane of plate 10 is the brush plate 40. This plate, similarly to plate 10, is made of dielectric material and is provided with current conducting bolts as 42, 44 and 46. These are provided with suitable securing nuts as 47 so that the various conductors as 50, 51 and 52 forming the electric cable 54 can be secured thereto. Bolts 42, 44 and 46 pass through plate 40 and provide the electric conductor to the inner face of plate 40 and supply the current channels to the various brush members. It has been found most convenient to arrange the inner or working face of plate 40 similar to the commutator ring plate in that a central contact circle 58 be provided and then a plurality of concentric conductor rings as 59 and 60 which conform to the showing of the drawings and is illustrative of a three-wire construction. Each additional circuit to be passed would require an additional ring suitably secured to additional resilient brush members as 62 and 63 for the first ring, and 64 and 65 for the second ring. These members are preferably made of resilient or spring-like conductive material and may be secured to the conductor rings as by bolting, riveting, brazing or welding thereto. The ends of these brush members are bifurcated and provided with revolvable contact members as 67 for the inner ring and 68 for the outer ring. Experience has further indicated that two such contact members are desirable for each conductor ring.

Plate 40 is supported in its revolvable positioning by ball race 70, the associated balls 71 of which run in annular grooves formed at 72 in plate 40 and at 74 in housing member 30. This action centers plate 40 coaxially with housing 30 and with plate 10. Plate 40 is held in engagement with balls 71 by the action of the plurality of resilient brush members 62, 63, 64 and 65 assisted further by the resilient central contact member 75 which is backed up by a compression spring 76 and the combined effort of these various resilient brush members has been found adequate to hold plate 40 in proper operating position with respect to housing 30. For sake of clarity certain of the brush elements have not been shown in Figure 1, a complete cross sectional view showing all the associated parts becoming too confusing for clarity of explanation. In order that plate 40 should be free to revolve with respect to housing 30 and plate 10, it has been found very desirable to provide an antifriction bearing to support the incoming power cable 54. This bearing is illustrated at 78. It has also been found desirable to employ a thrust collar at 80 encircling the end of cable 54 so as to take the strain occasioned by the weight of cable 54 and any manual pull that may be placed upon it. Also when the housing is modified after the showing of Figure 2, a similar thrust collar is provided at 82 to prevent any strain on the terminal connections of the conductors 84, 85 and 86 constituting the output cable 88.

It is to be recognized that my swivel connector may be variously employed and two forms of housing are shown in Figures 1 and 2. In Figure 1 the form is shown which is preferable for fixed mounting either to a power tool or a wall as illustrated or, to a junction box. The form as shown in Figure 2 has been found desirable wherever relatively long power cables are employed. The working parts in both forms are exactly the same in structure and the form shown in Figure 2 is normally employed on the end of a relatively long power supply cable with a relatively short cable connecting the unit to the power device.

It is believed that it will be clearly apparent from the above description and disclosure in the drawings that the invention comprehends a novel construction of swivel connectors for use with a power cable having a plurality of conductors.

Having thus disclosed the invention, I claim:

1. A swivel connector for a plurality of electrical conductors, comprising: a hollow housing having an axial opening in one end; a brush plate and a collector ring plate positioned in said housing coaxial with each other and with said opening and spaced apart from and parallel to each other; said collector plate having a plurality of spaced conductor rings and a central contact coaxial with said opening, said brush plate having a plurality of resilient brush members extending obliquely from said brush plate and having revolvable contact rollers at their distal ends bearing on said conductor rings, there being at least two brushes for each conductor ring, said brush plate having a centrally-positioned contact pin and having spring means biasing said contact pin into contact with said central contact on said collector plate; an anti-frictional bearing between said housing and said brush plate rotatably mounting said brush plate; a cable positioned in said opening and secured to said brush plate and said housing having anti-frictional bearing means positioned adjacent the opening rotatably supporting the cable and including thrust means holding said cable against withdrawal from said housing, electrical conductor means secured to said collector ring plate, said electrical conductor means and said cable having separate strands connecting to said brush members, contact pin, central contact and conductor rings.

2. A swivel connector for a plurality of electrical conductors, comprising: a hollow housing having axially aligned openings in its ends; a brush plate and a collector ring plate positioned in said housing coaxial with each other and with said openings and spaced apart from and parallel to each other; said collector plate having a plurality of spaced conductor rings and a central contact coaxial with said openings, said brush plate having a plurality of resilient, helical brush members extending obliquely from said brush plate and having revolvable contact rollers at their distal ends bearing on said conductor rings, there being at least two brushes for each conductor ring, said brush plate having a centrally-positioned contact pin and having spring means biasing said contact pin into contact with said central contact on said collector plate; an anti-frictional bearing between said housing and a first of said plates rotatably mounting said first plate; electric conductor means extending through each axial opening and secured to the adjacent plate providing exterior connection to said brush members, central contact, contact pin and conductor rings; the electric conductor means connecting to said first plate being in the form of a cable and said housing having anti-frictional bearing means positioned adjacent the opening through which said cable extends rotatably supporting the cable and including thrust means holding said cable against withdrawal from said housing.

3. A swivel connector for a plurality of electrical conductors, comprising: a hollow housing having an axially aligned opening in one end; a brush plate and a collector ring plate positioned in said housing coaxial with each other and with said opening and spaced apart from and parallel to each other; said collector plate having a plurality of spaced conductor rings coaxial with said opening and said brush plate having a plurality of resilient, helical brush members extending obliquely from said brush plate and having revolvable contact rollers at their distal ends bearing on said conductor rings, there being at least two brushes for each conductor ring; an anti-frictional bearing between housing and said brush plate rotatably mounting said brush plate; electrical conductor means secured to said collector ring plate and a cable positioned in said opening and secured to said brush plate and said housing having antifrictional bearing means positioned adjacent said opening rotatably supporting the cable and including thrust means holding said cable against withdrawal from said housing, said electrical conductor means and said cable having separate strands connecting to said brush members and conductor rings.

4. A swivel connector for a plurality of electrical conductors, comprising: a hollow housing having axially aligned openings in its ends; a brush plate and a collector ring plate positioned in said housing coaxial with each other and with said openings and spaced apart from and parallel to each other; said collector plate having a plurality of spaced conductor rings coaxial with said openings and said brush plate having a plurality of resilient, helical brush members extending obliquely from said brush plate and having revolvable contact rollers at their distal ends bearing on said conductor rings, there being at least two brushes for each conductor ring; an anti-frictional bearing between said housing and a first of said plates rotatably mounting said first plate; electric conductor means extending through each axial opening and secured to the adjacent plate providing exterior connection to said brush members and conductor rings, the electric conductor means connecting to said first plate being in the form of a cable and said housing having anti-frictional bearing means positioned adjacent the opening through which said cable extends rotatably supporting the cable and including thrust means holding said cable against withdrawal from said housing.

5. The subject matter of claim 4 in which said housing is belled from a smaller diameter at one end to a larger diameter at the other end which is open and of a size to permit withdrawal of said plates therethrough and has a threaded interior surface and an annular base positioned at said other end of said housing and having threaded connection with said threaded interior surface and said base having a flange of larger diameter than said housing which is apertured to be secured to a supporting surface by screws.

References Cited in the file of this patent

UNITED STATES PATENTS

| | | |
|---|---|---|
| 1,347,577 | Dewald, Jr. | July 27, 1920 |
| 1,714,672 | Hudson | May 28, 1929 |
| 1,768,260 | Larkey | June 24, 1930 |
| 1,956,966 | Tromanhauser | May 1, 1934 |
| 2,037,457 | Colson | Apr. 14, 1936 |
| 2,288,259 | Gladulich | June 30, 1942 |

FOREIGN PATENTS

| | | |
|---|---|---|
| 563,898 | Germany | Nov. 11, 1932 |